United States Patent
Mazur et al.

(10) Patent No.: US 10,430,069 B2
(45) Date of Patent: Oct. 1, 2019

(54) DEVICE, A METHOD AND/OR A NON-TRANSITORY COMPUTER-READABLE STORAGE MEANS FOR CONTROLLING PLAYBACK OF DIGITAL MULTIMEDIA DATA USING TOUCH INPUT

(71) Applicant: Native Instruments GmbH, Berlin (DE)

(72) Inventors: James Peter Mazur, Berlin (DE); Scott Hobbs, Berlin (DE)

(73) Assignee: NATIVE INSTRUMENTS GMBH, Berlin (DE)

( * ) Notice: Subject to any disclaimer, the term of this patent is extended or adjusted under 35 U.S.C. 154(b) by 235 days.

(21) Appl. No.: 14/172,153

(22) Filed: Feb. 4, 2014

(65) Prior Publication Data

US 2014/0229829 A1    Aug. 14, 2014

(30) Foreign Application Priority Data

Feb. 8, 2013 (EP) .................................. 13154667

(51) Int. Cl.
| | | |
|---|---|---|
| *G06F 3/0488* | (2013.01) | |
| *G11B 27/02* | (2006.01) | |
| *G06F 3/16* | (2006.01) | |
| *G11B 27/00* | (2006.01) | |
| *G11B 27/34* | (2006.01) | |

(52) U.S. Cl.
CPC .......... *G06F 3/04883* (2013.01); *G06F 3/165* (2013.01); *G11B 27/005* (2013.01); *G11B 27/02* (2013.01); *G11B 27/34* (2013.01)

(58) Field of Classification Search
CPC ................................ F06F 3/165; F06F 3/0484
USPC ........................................................ 715/716
See application file for complete search history.

(56) References Cited

U.S. PATENT DOCUMENTS

| | | | | |
|---|---|---|---|---|
| 6,307,141 B1* | 10/2001 | Laroche | ................... | G10H 1/40 84/636 |
| 2002/0020279 A1* | 2/2002 | Funaki | ................. | G09B 15/001 84/478 |

(Continued)

FOREIGN PATENT DOCUMENTS

| | | |
|---|---|---|
| EP | 2 426 665 A1 | 3/2012 |
| GB | 2 496 304 A | 5/2013 |

OTHER PUBLICATIONS

"GarageBand '09 Getting Started", 2009, Apple, All pages.*
European Search Report dated Jun. 19, 2013.

*Primary Examiner* — Kieu D Vu
*Assistant Examiner* — Roberto Borja
(74) *Attorney, Agent, or Firm* — Norris McLaughlin, P.A.

(57) ABSTRACT

A device and/or method controls playback of digital multimedia data and comprises, at least in part, at least one touch-sensitive graphical user interface for data input and data output. The device is configured for displaying data input, data output, a representation of at least a part of the multimedia data, and at least one marker for indicating a position within the multimedia data for starting playback, wherein at least a part of the at least one marker has assigned a region of the representation, and for playing back, in response to a touch gesture, the multimedia data, where the touch gesture contacts a region, and where the playback starts from a position indicated by the marker, which has assigned the contacted region.

5 Claims, 1 Drawing Sheet

(56) References Cited

U.S. PATENT DOCUMENTS

Figure 1:
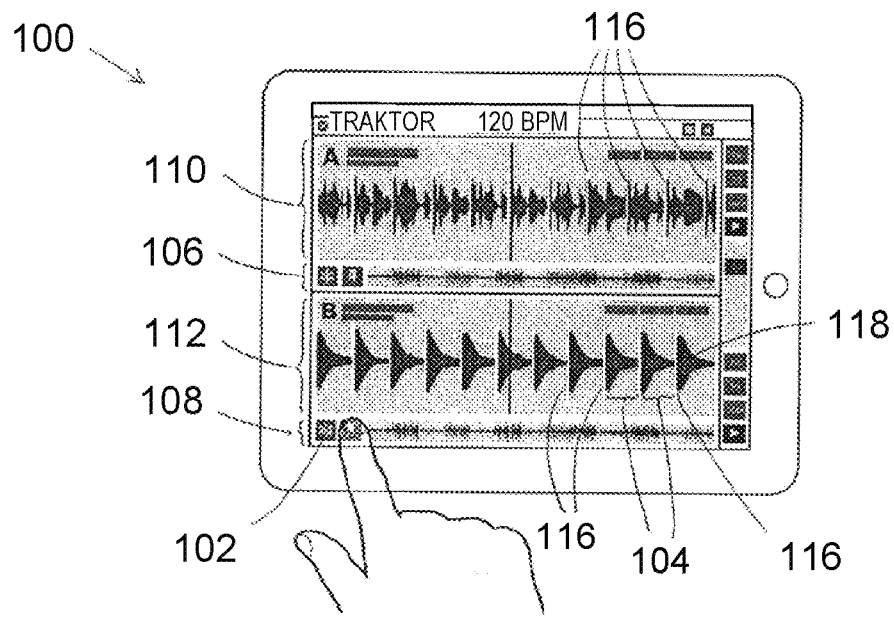

| | | | |
|---|---|---|---|
| 2004/0027369 A1* | 2/2004 | Kellock | G11B 27/34 715/716 |
| 2007/0182763 A1* | 8/2007 | Venolia | G06F 3/0481 345/661 |
| 2008/0013757 A1* | 1/2008 | Carrier | G10H 1/0008 381/119 |
| 2010/0278504 A1 | 11/2010 | Lyons et al. | |
| 2011/0029867 A1* | 2/2011 | Park | G06F 3/04886 715/702 |
| 2011/0258547 A1* | 10/2011 | Symons | G06F 3/04817 715/723 |
| 2012/0014673 A1 | 1/2012 | O'Dwyer | |
| 2014/0208922 A1* | 7/2014 | Adnitt | G06F 3/048 84/609 |
| 2014/0325357 A1* | 10/2014 | Sant | G06F 17/30053 715/716 |

* cited by examiner

DEVICE, A METHOD AND/OR A NON-TRANSITORY COMPUTER-READABLE STORAGE MEANS FOR CONTROLLING PLAYBACK OF DIGITAL MULTIMEDIA DATA USING TOUCH INPUT

The invention concerns a device and a method for controlling playback of digital multimedia data as well as a corresponding computer-readable storage means and a corresponding computer program which are usable for facilitating controlling of digital multimedia data, especially of controlling digital audio data when DJing using a tablet computer.

PRIOR ART

From its early days of mixing two vinyl records together to facilitate continuous music play, to "live-producing" today, DJing has come a long way. Yet the principles of matching two pieces of music's speed and rhythm to be able to seamlessly cross-fade between them have remained the same. Today's DJs can resort to a vast collection of software and hardware controllers that resemble the workflow of "analogue" DJing, yet they can still play purely analogue with two record players and a mixer like their predecessors, or even combine both worlds by using vinyl timecode records. (By this, their "interface"—the vinyl records on a record player plus a mixer with a crossfader—remains the same, the audio playback is, however, coming from a computer that is controlled by the timecode records.)

While some software has enabled novel approaches to digital DJing (what is often referred to as "live producing") other software emulates the analogue workflow of mixing two records.

With the introduction of touch-controlled computers, especially of tablet computers, digital DJing has recently gained an additional platform. Although many of the DJ applications available for tablet computers do not yet achieve the functionality and professionalism offered by their computer-based counterparts, they have, however, become successful by offering non-professionals an easy access to DJing. Many of these applications make heavy use of skeuomorphism by displaying abstractions of record players and their corresponding tone arms, others display no abstraction of physical controls but only waveforms. They do, however, lack enhanced means for interaction, and therefore are not really applicable for professional DJing.

One application that has implemented enhanced and novel means for interaction possibilities on a waveform view is a recently introduced multi-touch sampling instrument for tablet computers. The sampling instrument enables a user to recompose samples and loops by restructuring them, altering their playback speed, layering them, adding effects, and much more. The application is, however, not providing a DJ-targeted workflow.

It is therefore an object of the invention to provide a device and a method for controlling playback of digital multimedia data and a corresponding computer program and a corresponding computer-readable storage medium, which obviate the aforedescribed disadvantages and, more particularly, which facilitate controlling of digital multimedia data by use of a portable control device.

SUMMARY OF THE INVENTION

This object is solved by the invention by the features of the independent claims. Advantageous embodiments of the invention are recited in the dependent claims.

A particular advantage of the present invention consists in that so-called cue points within a multimedia track can be controlled directly and interactively without the need of predefining a fix set of cue points in advance. This is achieved by a device for controlling playback of digital multimedia data, where the device comprising at least one touch sensitive means for data input and data output. In a preferred embodiment of the invention, at least a part of the touch-sensitive means for data input and data output is realized as touch-sensitive graphical user interface (GUI) for example as a touch screen. According to the invention, the device is configured for displaying in the means for data input and data output a representation of at least a part of the multimedia data and at least one marker for indicating a position within the multimedia data for starting playback. Preferably, the markers represent cue points for playing back the multimedia data. In a preferred embodiment digital audio data is represented in form of a waveform. Preferably, at least a part of the marker indicates positions within the multimedia data, which succeed when the multimedia data is played back. In a preferred embodiment of the invention, the markers represent beats or bars of a track, especially of a piece of music. Therefore, the markers are also called beat-grid.

According to the present invention, the device is further configured for playing back the multimedia data in response to a touch gesture. If the touch gesture contacts a region, the play back starts from a position within the multimedia data, which is indicated by a marker having assigned the contacted region. Especially, in response to the touch gesture, a sequence of temporarily and/or spatially consecutive multimedia data is played back starting at the indicated position.

According to a preferred embodiment, during playing back one or more tracks of multimedia data a user is enabled to intervene, modify or manipulate the play back. For example, a currently playing track is scratched, e.g. speed and/or direction of the play back of the track are changed. According to another preferred embodiment, the user is enabled to continue a currently playing track of multimedia data at a new play back position (on-the-fly play-position relocation).

In a preferred embodiment, at least one of the means for data input and data output is subdivided into at least two touch sensitive portions. According to the invention, the device is configured for displaying in a first and a second portion a representation of at least part of the multimedia data. The device is further configured for displaying in the first portion a representation of (only) a part of the multimedia data, which is displayed in the second portion. The representation in the first portion is therefore called excerpt representation, and the representation in the second portion is therefore called entire representation. According to a preferred embodiment in the second portion is a waveform of an entire track of audio data represented, while in the first portion only a section of the entire waveform is displayed.

According to a preferred embodiment of the invention, the first portion shows representations of succeeding parts or regions of the multimedia data, where the parts or regions are distinguished from each other by a marker. Thus, the first portion displays a sequence of succeeding sections of the multimedia data. In a preferred embodiment, the multimedia data is represented by a waveform, which is subdivided by lines indicating beats or bars. In the following description, a part or region between two markers is also called 'slice'.

In a preferred embodiment of the invention, the part of the multimedia data, which is displayed in the first portion, is scalable. In this manner the resolution of the displayed representation can be increased. According to a preferred embodiment, the excerpt representation in the first portion is scaled by user interaction with the touch sensitive means for data input and data output. For example, the part of the multimedia data, which is displayed in the first portion, can be scaled by a two finger gesture, where for example a two-finger spreading results in a zooming in the excerpt waveform, i.e. the displayed excerpt waveform represents a shorter part out of the multimedia data, but displays the representation in more detail. Conversely, zooming out is achieved by a two-finger pinching gesture. In this case, the displayed excerpt waveform shows less details, but represents a larger part out of the multimedia data. Since, when zooming in, a fix pattern of markers could move outside the displayed region, or when zooming out, too many markers are displayed, according to a preferred embodiment of the invention at least a part of the markers are dynamically set. For example, in a default setting, one marker is set for each beat in a track, i.e. in common modern dance music, a slice has a length of ¼ bar. For refining the grid formed by the markers, ⅛, 1/16 or smaller beat markers may be added to the representation while a user zooms in the representation of the multimedia data. Conversely, while zooming out, a part of the markers are removed. In this manner, the representation can be quantized dynamically depending from the zoom factor. For zooming in and out any suitable touch gesture can be used, for example also pinching for zoom in and spreading for zoom out. Thus, with the help of the invention, the user can define starting points freely in a wide range according to his requirements.

The present invention enables a user to jump during play back of a track to a desired start position for play back by touching a region, which is displayed on the means for data input and output and which is assigned to the desired starting point. In a preferred embodiment, markers have assigned the subsequent slice, i.e. the slice which succeeds the starting point when the multimedia data is played. Thus, play back of multimedia data is started at a desired starting point by touching the slice between the marker of the desired starting point and the subsequent marker. This is an intuitional way of starting a playback, since the touched slice corresponds to the data to be played. According to a preferred embodiment, when a user touches a slice, playback is started at the position which is indicated by the preceding marker. Preferably, play back starts quantized to the beat of the multimedia data. The level of quantization can be set to by the user between one bar down to a quarter beat. For example, if the user set the quantization level to one beat, the playback of the touched slice starts at the next beat, and the track keeps time.

According to another preferred embodiment, when a user touches a slice, playback is started at the position which is indicated by the preceding marker. Preferably, play back starts synchronous with the beat of the multimedia data. As mentioned above, the beat grid can be quantised. For example, if the beat grid is quantised in one-beat slices, the playback starts at the next beat, and the track keeps time.

According to a preferred embodiment of the invention, the first portion can be used in at least two modes. In a first mode, during playback of the multimedia data a part of the corresponding representation of the multimedia data is moving through the first portion. Preferably, the position of playback is indicated within the representation, for example centred in the first portion as a vertical line or as a pointer. The first mode, in a preferred embodiment, enables a user to manipulate direction and/or speed of the playback by touch gesture, for example by moving a finger on the touch sensitive means, especially on the first portion. Other manipulations are thinkable in the first mode, for example defining a new playback position by touching the first portion at the desired position of the representation. In the second mode, the markers with the assigned regions are displayed and enabling a user to control playback position by touching a region associated with the desired playback position. In a preferred embodiment, in the second mode the representation of the multimedia data stops moving. According to a preferred embodiment, in the second mode, the position of playback, which is indicated by a vertical line or by a pointer, moves. Switching between first and second mode may be initiated by a touch gesture. Preferably, a corresponding button is displayed on the touch-sensitive means, where touching the button changes the mode from first to second or from second to first mode. If more than two modes are usable, pushing the button may change the modes cyclically. After the mode has been switched from the second to the first mode, the representation of the multimedia data starts moving and the indication of the play back position is centred in the first portion.

While DJing in general two or more sets of multimedia data are mixed. Therefore, in a preferred embodiment the device comprises at least two pairs of first and second touch sensitive portions, where different pairs of first and second portions are assigned to each of the at least two sets of multimedia data. In this manner, for example representations of a first track of digital audio data is displayed on a first pair of first and second portions, and representations of a second track of digital audio data is displayed on a second pair of first and second portions. Thus, according to a preferred embodiment of the invention, the first pair of first and second portions is set in the first mode, and the second pair of first and second portions is set in the second mode, thus enabling a user to play the first track continuously while setting in quick succession new starting points for the second track. In this manner, the first track is mixed with so-called cue-point juggling or cue-point drumming.

In a preferred embodiment, the device for controlling playback of digital multimedia data is designed as portable end device, for example as a tablet computer. In general the device is realized as data computing unit, where the data computing unit comprises at least a processor for executing program instructions, internal storage means for storing program code, means for data input and output and a communication interface. The data computing unit further can be combined with external storage means for storing program code. The internal or external storage means can serve as the inventive computer-readable storage means.

According to the invention, a method for controlling playback of digital multimedia data is proposed, where the method comprises:

providing at least one touch sensitive region for data input and data output, wherein in the means for data input and data output a representation of at least a part of the multimedia data and at least one marker for indicating a position within the multimedia data for starting playback is displayed, where at least a part of the markers each has assigned a region of the representation, and playing back in response to a touch gesture, the multimedia data, where the touch gesture contacts a region, and where the playback starts from a position indicated by the marker, which has assigned the contacted region.

A computer program according to the invention enables a data processing system, after the computer program has been loaded into the memory of the data processing system, to execute a method for controlling playback of digital multimedia data, where at least one touch sensitive region for data input and data output is provided, and wherein in the means for data input and data output a representation of at least a part of the multimedia data and at least one marker for indicating a position within the multimedia data for starting playback is displayed, where at least a part of the markers each has assigned a region of the representation, and where in response to a touch gesture, the multimedia data are played back, where the touch gesture contacts a region, and where the playback starts from a position indicated by the marker, which has assigned the contacted region.

Such computer programs may be provided, for example, for downloading (for a fee or free of charge, freely accessible or password-protected) in a data or communication network. The provided computer programs can be used with a method whereby a computer program is downloaded from an electronic data network such as, for example, the Internet, to a data processing system connected to the data network.

For performing the method according to the invention, a computer-readable storage means is used, on which a program is stored that enables a data processing system, after the program has been loaded to the storage means of the data processing system, to execute a method for controlling playback of digital multimedia data, where at least one touch sensitive region for data input and data output is provided, and wherein in the means for data input and data output a representation of at least a part of the multimedia data and at least one marker for indicating a position within the multimedia data for starting playback is displayed, where at least a part of the markers each has assigned a region of the representation, and where in response to a touch gesture, the multimedia data are played back, where the touch gesture contacts a region, and where the playback starts from a position indicated by the marker, which has assigned the contacted region.

The invention provides several advantages compared with conventional solutions. Most current DJ software is used in conjunction with a dedicated hardware controller, which provides the user with an array of buttons, knobs and faders for precise parameter control. The DJ software running on the computer usually mirrors all the hardware controller's functionality, however, during a performance it is mainly providing visual feedback, while most user interactions are carried out on the controller.

With the new touch-controlled version of the inventive controller for multimedia data, the invention takes a radical new design approach toward a less skeuomorphic aesthetic: The touch-controlled user interface of the inventive controller is dominated by two waveform view widgets. Each of this waveform views shows an excerpt (excerpt-waveform) of the song that is currently playing in the corresponding deck. Underneath each of the excerpt-waveform views, a much smaller widget displays the waveform of the entire song (entire-waveform). Other DJ software usually also displays both waveform views, they are, however, way less dominant to other user interface elements.

As the touch-controlled inventive controller needs to be used standalone without a dedicated hardware controller, its user interface alone enables DJs to precisely control all the functionality required, with only their fingers on a touch screen as primary means of interaction. Therefore, several new interaction methods needed to be conceived, with the two waveform views as main interaction surfaces.

Figure 2:
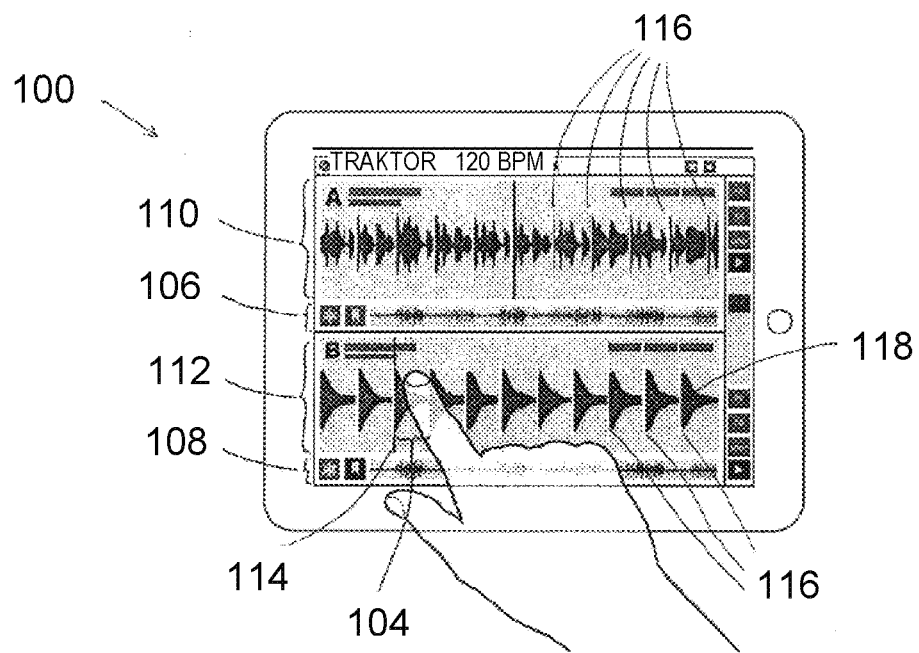

Exemplary embodiments of the invention will now be described in more detail with reference to the appended figure, which show in FIGS. 1 to 2 an exemplary user interface of a device for controlling digital music data, where a beat-grid pattern as cue-points is added.

Particular embodiments of the invention will now be described in more detail. The following specification details five novel interaction methods of the touch-controlled inventive controller, each with an explanation in which the method differs from the state-of-the-art in DJ software. While the invention is described with the help of an example where digital music data is controlled, the invention is not limited to controlling digital music data, but the present invention comprises controlling of any multimedia data.

Dynamic Beat Grid Segmentation Based on an Audio Waveform View's Zoom Factor

Most conventional DJ software displays a visual beat-grid pattern on top of a waveform view. The beat-grid is usually based on an automated analysis of the audio data, and aids to indicate where the beats and the bars are located in the audio material. This can give visual cues to a DJ who manually beat-syncs two tracks. Apart from that, most conventional DJ software uses the beat-grid to auto-synchronize two songs that are playing simultaneously.

A DJ technique that has gained momentum with digital DJing is the so-called cue-point juggling, or cue-point drumming. For this technique, the DJ pre-defines cue-points in a track, and, while performing, repeatedly jumps playback between the positions of the cue-points by pressing the cue-point's corresponding buttons on a hardware controller.

When a number of cue-points are in line with the beats, and correspond to e.g. a kick drum, snare and hi-hat hit in the underlying audio material, the DJ can quite effectively remix a track using the cue-points while staying in synchronisation with the overall tempo and rhythm of his performance. The cue-points are then played very similar to drum samples in a digital drum machine, hence the term cue-point drumming.

The touch-controlled inventive control device 100 introduces a new way of remixing tracks on-the-fly called beat-grid drumming: A DJ can by touching a dedicated widget 102 on the screen switch the excerpt-waveform view 110, 112 into "freeze-mode", in which the currently displayed portion of the waveform 118 stops scrolling. The DJ can then play the different parts or regions of the waveform 118, which is visually divided by the beat-grid, by touching the area 104 between two successive beat-grid markers, i.e. beat-grid lines 116. In this mode, each of the beat-grid lines 116 functions as a virtual cue-point, and each of the areas 104 between the beat-grid lines 116 as a button to trigger playback of the corresponding audio material. When the area 104 between two successive beat-grid lines 116 is touched, playback of the audio material starts at the beat grid line 114 at the beginning of the area 104. As the beat-grid is auto-detected, the DJ does not need to pre-define cue-points in order to use this routine.

An additional novelty of this concept is that the resolution of the beat-grid is dependant on the duration and tempo of the audio material displayed in the excerpt-waveform view 110, 112. Usually a beat-grid in conventional DJ software displays only one marker, i.e. line 116 per beat, and, hence due to the common 4/4 measure in modern dance music, 4 beats per bar. As a user can define the length of the section of the song that is shown in the excerpt-waveform view 110, 112 by a two-finger spreading and pinching gesture on the entire-waveform view 106, 108, it is possible that the displayed waveform 118 represents audio of a duration between less than a bar up to multiple bars.

If more than two bars of audio are visible, the beat-grid is subdivided into one-bar parts. With lesser bars of audio visible, the beat-grid is dynamically subdivided into smaller portions, i.e. depending on the zoom level, additional markers 116 for half, quarter, and eight-beats become visible. Therefore a user can at a high zoom level use the beat-grid drumming technique to trigger parts of the audio material that begin offbeat, whereas on a low zoom level, only audio parts that begin with a beat can be triggered.

Conventional DJ software does not allow for this functionality at all. The concept is novel in two ways: Employing the beat-grid for automated and dynamic cue-point setting, and dynamically refining the beat-grid based on the level of detail in a waveform view.

Audio Waveform View and Playback Position Decoupling for In-Beat On-The-Fly Play-Position Relocation On-the-fly play-position relocation in DJ software is usually performed by clicking onto the desired new position in the entire-waveform view. Clicking and dragging the excerpt-waveform view usually brings DJ software into scratch mode, in which the new playback speed and direction is determined by the user's subsequent mouse movement.

On a touch-based input device 100 however, touching the entire-waveform view at a desired position for on-the-fly play-position relocation would be too imprecise due to the accuracy shortcomings of the conventional input method. Hence for the touch-based inventive control device 100, a new method for on-the-fly play-position relocation is proposed:

A semi-transparent overlay (excerpt-overlay) on the entire-waveform view 106, 108 displays which part of the song is currently shown in the excerpt-waveform view 110, 112. Additionally, the entire-waveform view 106, 108 displays a play cursor indicating the current playback position of the song.

The user can use two finger spreading and pinching gestures on the entire-waveform view 106, 108 to adjust the length of the section that is shown in the excerpt-waveform view 110, 112.

In normal "play" mode, the section displayed in the excerpt-waveform view 110, 112 moves along with the play cursor, making the displayed waveform 118 scroll through the view's screen estate. If the user touches the excerpt-waveform view 110, 112 in normal "play" mode, the underlying waveform 118 stops scrolling and its play position is now dependent on the user's finger movement, enabling the user to scratch the audio.

To bring a portion of the waveform that is not centred around the current play cursor position into view, the user can reposition the excerpt-overlay. In this "seek" mode, the excerpt-waveform view 110, 112 is static. By now tapping on the excerpt-waveform view 110, 112, the user can not scratch, but set a new playback position. Due to the higher time-resolution of the excerpt-waveform view 110, 112, the touch-based input method yields enough accuracy for precise play-position relocation.

Once the user has set a new play-position, the control device takes over playback from this position in sync with the beat-phase. At the time the audio engine has taken over playback at the new position, the excerpt-waveform view 110, 112 starts scrolling again, letting the user scratch the audio the next time he touches the excerpt-waveform view 110, 112.

The novelty of this concept is that the user can still scratch audio by touching on the excerpt-waveform view 110, 112, however, by repositioning the excerpt overlay still use the excerpt-views higher resolution over the audio material to precisely set a new playback position.

Loop Selection on an Audio Waveform View Using Two-Finger Touch Gestures

Another routine commonly used by DJs in conjunction with digital DJ software is on-the-fly looping of a played song: Many conventional DJ routines include looping one portion of one track while playing another track over the loop, or shortening a currently playing loop over time to achieve tension in a mix.

Conventionally, DJ software provides dedicated software controls to set in- and out-points for loops, and additional shortcuts to set loops of different duration, e.g. 4 bars, 2 beats, or different musically meaningful subdivisions of one beat. The touch-controlled inventive control device does not provide the user with dedicated software controls for setting loops of different lengths, but with only one dedicated loop button that will always engage a loop of a pre-defined length (commonly a four-bar loop, the length of a phrase in modern dance music) from the current playback position when tapped, or release that loop again.

If the user wants to engage a loop of a different length than the four-bars as controlled with the loop button, he can use a two-finger tap gesture on the excerpt-waveform view 110, 112, whereby the distance between the user fingers in conjunction with the current zoom level is defining the length of the loop. The loop is quantized to the granularity of the currently displayed beat-grid.

After the user has engaged a loop, the length of the loop is displayed by a semi-transparent visual overlay on top of the excerpt-waveform view. To disengage the loop, the user can again two-finger tap the overlay, or he can tap the dedicated loop button.

Conventional DJ software does not allow for directly setting a loop visually on a waveform view.

Loop Length Adjustment on an Audio Waveform View Using Touch Gestures

Once a user has engaged a loop over the currently playing audio material, the length of the loop is adjustable. To modify the length of the loop, the user can with a two finger pinch or spread gesture modify the length of the loop overlay on the excerpt-waveform view. The newly set loop length is still quantized to the current beat-grid's level of detail.

Conventional DJ software does not allow for a direct visual adjustment of the length of a loop, but dedicated buttons enable a user to adjust the length of a loop.

Loop Slice Playback on an Audio Waveform View Using Touch Gestures

Once a user has engaged a loop over the currently playing audio material, the user can additionally switch the excerpt-waveform view into "freeze-mode". In this mode, the waveform representation of the looped region is spread out over the entire excerpt-waveform view, split into slices by the dynamic beat-grid markers. The duration of each slice is therefore depending on the initial length of the engaged loop. Without further interaction, the playback position keeps looping over the displayed waveform. If the user touches a slice, only this slice keeps looping. If a user uses two fingers, the slices between the two touch points are looping. The user can adjust the looped "area" by pinch or spread gestures.

Differently from play mode in "freeze-mode" without an additionally engaged loop, the playback of a slice after a user touched it is not quantized to the beat of the audio material, but starting immediately. Further, if a user lifts the finger(s) from the touch screen, the playback is not resumed from the current playback position, but from the position in the loop where the playhead would currently be had the user not further interacted ("flux-mode").

Beat Grid Position Adjustment on an Audio Waveform View Using Touch Gestures

Most conventional DJ software performs beat-grid analysis on the basis of lowlevel onset event and periodicity information from beat tracking on the audio data. These analysis methods generally yield results with a high-enough accuracy for beat-gridding of most standard dance music.

If the beat-pattern of the analyzed music material is, however, non-conformist, the analysis results might be imprecise and even outright wrong. An example for a nonconformist beat-pattern would be that e.g. the kick drum of a drum beat is placed on the musical "two", which might result that the beat-grid is off by one beat, i.e. that the "downbeat"—the musical "one" of the beat—is misrecognized.

The touch-controlled inventive control device provides the DJ with means to correct an inaccurate beat-grid. Similar to what most current DJ software provide, the DJ can tap the tempo of the song in order to correct for a wrongly identified tempo, or half/double the recognized beat-grid's resolution to correct analysis mistakes due to e.g. a half-time drum beat.

On top of that, the touch-controlled inventive control device provides a novel way to correct for a misrecognized downbeat: On a dedicated beat-grid correction screen that can be brought into view, the user can displace the audio waveform of the song against the beat-grid using a swiping gesture. This interaction concept is novel to other DJ software in that the user does not have to delete a misrecognized beat-grid and manually set a new downbeat marker and the beats per minutes, but can reuse the mostly correctly recognized beat-pattern while just intuitively shifting the downbeat marker against the audio waveform.

The invention claimed is:

1. A device for controlling playback of digital multimedia data, the device is a data processing unit and comprises at least one touch sensitive graphical user interface for data input and data output, wherein the at least one touch sensitive graphic user interface is a touch screen, wherein the device is configured for displaying, in the at least one touch sensitive graphic user interface, a representation of at least a part of the digital multimedia data and a plurality of markers for indicating positions within the digital multimedia data for starting playback, wherein the digital multimedia data is represented in a form of a waveform and the plurality of markers, comprising markers, indicate bars or fractions of a bar of the digital multimedia data, wherein the markers thereby represent a beat-grid, wherein the waveform that represents the digital multimedia data is visually divided by the markers;

for changing a resolution of the digital multimedia data in response to a first touch gesture, wherein the first touch gesture comprises at least one selected from pinching and spreading;

for automatically defining the markers representing the beat-grid depending from the resolution of the representation of the digital multimedia data, which is displayed in the at least one touch sensitive graphical user interface, wherein, while zooming into the representation, new markers are added, and, while zooming out of the representation, part of the markers are removed; and wherein each marker is associated with a region of the representation of the digital multimedia data or, optionally, a region between the marker and a subsequent marker, and dynamically during playing back of the digital multimedia data and, in response only to a second touch gesture to a contacted area of the waveform between two successive markers, relocating playback position so that the playback continues at the beginning of the contacted area indicated by at least one of the two successive markers.

2. The device according to claim 1, wherein the representation represents temporally or spatially consecutive regions of the digital multimedia data, wherein the regions are separated by at least one marker.

3. The device according to claim 1, wherein the at least one touch sensitive graphical user interface is operable in at least two modes, wherein, one of the modes, the representation is a static representation.

4. A method for controlling playback of digital multimedia data, wherein at least one touch sensitive region for data input and data output is provided, and wherein, in the at least one touch sensitive region for data input and data output, a representation of at least a part of the digital multimedia data and more than one marker for indicating positions within the digital multimedia data for starting playback is displayed, wherein the digital multimedia data is represented in a form of a waveform and the more than one marker indicates bars or fractions of a bar of the digital multimedia data, the more than one marker thereby representing a beat-grid, wherein the waveform that represents the digital multimedia data is visually divided by the more than one marker, wherein a resolution of the digital multimedia data is changed in response to a first touch gesture, wherein the first touch gesture comprises at least one selected from pinching and spreading, wherein the more than one marker representing the beat-grid are automatically defined depending from the resolution of the representation of the digital multimedia data, which is displayed in the at least one touch sensitive graphical user interface, wherein, while zooming into the representation, new markers are added, and, while zooming out of the representation, part of the markers are removed, wherein each marker is associated with a region of the representation of the digital multimedia data or, optionally, a region between the more than one marker and a subsequent marker, and wherein, dynamically during playing back of the digital multimedia data and in response only to a second touch gesture to a contacted area of the waveform between two successive markers, relocating playback position so that the playback continues at the beginning of the contacted area indicated by at least one of the two successive markers.

5. A non-transitory computer-readable storage means on which a program is stored that enables a data processing system, once the program has been loaded into the memory of the data processing system, to execute the method for controlling playback of digital multimedia data according to claim 4.

* * * * *